Nov. 25, 1969   N. J. ANDERSON ET AL   3,480,123
SYNCHRONIZING FLEXIBLE COUPLING
Filed July 31, 1967   2 Sheets-Sheet 1

INVENTORS
NORMAN J. ANDERSON
BY JOHN L. DECKER

Charles L. Lovelock
atty

United States Patent Office 3,480,123
Patented Nov. 25, 1969

3,480,123
SYNCHRONIZING FLEXIBLE COUPLING
Norman J. Anderson and John L. Decker, Erie, Pa., assignors to Zurn Industries, Inc., Erie, Pa., a corporation of Pennsylvania
Filed July 31, 1967, Ser. No. 657,128
Int. Cl. F16d 11/06, 13/60, 19/00
U.S. Cl. 192—53      8 Claims

ABSTRACT OF THE DISCLOSURE

In the coupling disclosed herein, the crowned face and flanks of the external gear permit angular misalignment of each gear mesh without end loading of the gear teeth. The crowned flanks of the external gear, in contact with the flanks of the internal gear, result in well distributed contact. The radially crowned and chamfered tips of the external gear eliminate fillet root interference within the internal gear; the coupling in the engaged state transmits torque with no slip or loss in speed, thereby operating at peak efficiency. In the disengaged state, the coupling is completely disconnected and the only losses experienced are those of the bearing supporting the disconnected coupling half and very small loss in the synchronizing cone ring.

---

This invention relates to flexible couplings and, more particularly, to a combination flexible coupling and synchronizing clutch.

The coupling disclosed herein is primarily an adaption of the crowned tooth flexible gear coupling disclosed in Patent No. 2,682,760 and the clutch disclosed in Patent No. 3,182,567.

Both the coupling and synchronizing clutch have experienced applications in practically every industry.

The operation of the coupling, when engaged, is identical to the flexible coupling referred to in the above patent. Torque is transmitted through the crowned external gear teeth and matching internal splines. Concentricity of gear elements is maintained by the ball and socket piloting action of spherically crowned external gear mating within the cylindrical major diameter of the internal splines. This method imparts excellent concentricity for exceptional dynamic balance.

The synchronizing principle of this coupling is similar to the long established synchronizing gears in the manual shift automotive transmission and an extension of the same principle of the clutch referred to in Patent No. 3,182,567.

The synchronizing cone ring within the coupling prevents or blocks the engagement of the coupling if the disengaged gear hub and sleeve are not operating at the same speed.

It is, accordingly, an object of the invention to provide an improved coupling.

Another object of the invention is to provide a combination synchronizing clutch and flexible coupling.

Another object of the invention is to provide a flexible coupling and synchronizing clutch combination which is simple in construction, economical to manufacture and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
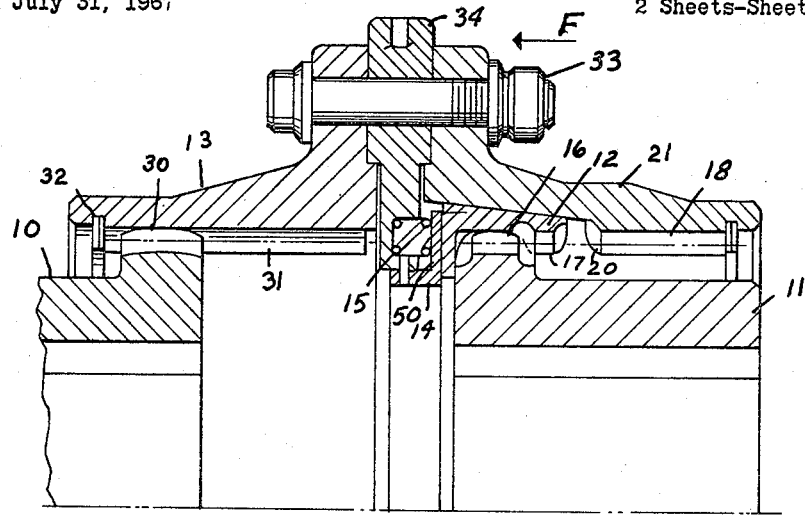
FIG. 1 is a cross sectional view of the synchronizing coupling according to the invention.

Now with more particular reference to the drawings, the coupling shown is made up of a drive hub 10 and a driven hub 11 which may be connected through the sleeve halves 13 and 21 to drive a load.

The drive hub has crowned external teeth 30 thereon which mesh with internal sleeve teeth 31 on sleeve half 13.

The two sleeve halves are connected together by means of a bolt 33 which passes through holes in the external flanges on the sleeve halves. A spacer plate 34 is fixed in position between the sleeve halves 13 and 21.

The coupling shown in FIG. 1 is in the disconnected state with the synchronizing cone ring 12 enclosing the disengaged external teeth 16 on the driven hub 11. The teeth 16 and the teeth 30 have a curved tip as shown and have flanks that are curved to conform to the shape of an ellipsoid similar to the teeth shown in Patent 2,682,760.

Figure 2:
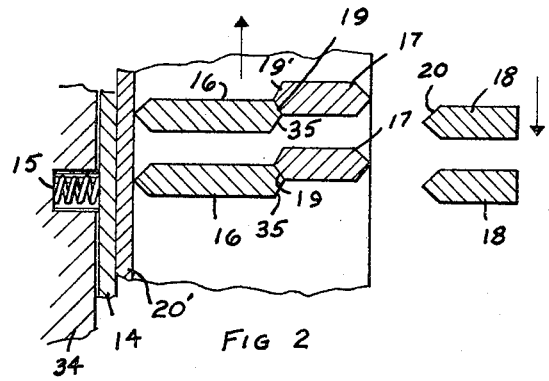
FIG. 2 is a schematic view of the circumference at the pitch diameter of the gear elements and cone ring of the embodiment shown in FIG. 1.

In the development of the circumference at the pitch diameter of the gear elements and cone rings 12, shown in FIG. 2, cone ring 12 has inwardly directed annular flange 20'. The direction of the rotation of the sleeve 13 and its driven pressure plate 14 exert a frictional drag or torque upon the cone ring 12 and pressure upon the pressure plate by spring 15 applies an axial force upon the cone ring 12. The axial force and torque upon the cone ring 12 forces upon the hub teeth 16 in such a manner that the cone ring flange 20' rests against the face of driven hub 11. The distance between the cone ring flange 20' and the teeth chamfer 19 is less than the length of the hub teeth 16, thereby assuring that the chamfer 19 of the hub teeth 16 rests upon the adjacent chamfer of the cone ring teeth 17. If the rotational direction of the sleeve half 21 is opposite, the opposite chamfers 19' on hub teeth 17 will engage the opposite chamfer 35 of the cone ring teeth.

An application of axial force by a hydraulic cylinder or some other device as indicated generally at F in FIG. 1 will cause an axial motion of the sleeve halves 13 and 21 in the direction of the force until the cone ring 12 begins to seat itself in the internally coned surface of the sleeve half 21. The contact of the outside of the cone ring 12 with the inner surface of the sleeve half 21 functions as a cone type clutch developing torque between the cone ring 12 and the sleeve half 21. The torque upon the cone ring 12 will be in the direction of the sleeve rotation.

Figure 3:
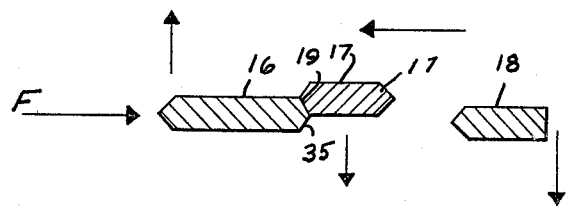
FIG. 3 is another schematic view of the gear teeth.

An analysis of FIG. 3 will indicate that if the torque between the cone ring 12 and hub 11 is high enough, the axial force could not push the teeth 17 on the cone ring 12 past the hub teeth 16 which block its axial travel by virtue of the contacting chamfers on surface 19. The premise herein is that the torque component in the axial direction must be equal or greater than the applied axial force. The axial component of torque can be regulated by the angle of the ends of teeth 16 and 17. The blunter the teeth or steeper the angle, the greater the axial component required to shift the clutch. The axial force due to torque can further be increased by an increase of torque itself.

The friction torque can be increased by decreasing the included angle of the friction cone and by an increase in axial force. With the foregoing in mind, an increase in axial force also increases the cone ring friction torque and subsequently increases the axial blocking force between the hub and cone ring teeth. The proper selection of cone ring angle and teeth chamfers can establish a system of forces that can block passage of the hub teeth past the cone ring teeth regardless of the magnitude of axial force. The only force neglected in the foregoing is the reaction torque presented by the hub. This reaction torque consists of the engaging torque or the resistive torque of the load connected to the hub and the accelerating torque of that same load. If the connected shaft were rotating at a different speed, then a torque can be transmitted between the two shafts via friction cone ring for the purpose of accelerating the driven hub 11 to a speed equal to the speed of the drive hub 10. Once the differential between the speeds of the drive hub and the driven hub is zero, there can no longer be an accelerating torque or a reaction torque.

The loss of reaction torque at the point where speed synchronism upsets the balance of forces upon the teeth chamfers will result in the hub pushing past the cone ring, and engagement of the hub teeth 16 with the sleeve teeth 18 will result.

Figure 4:
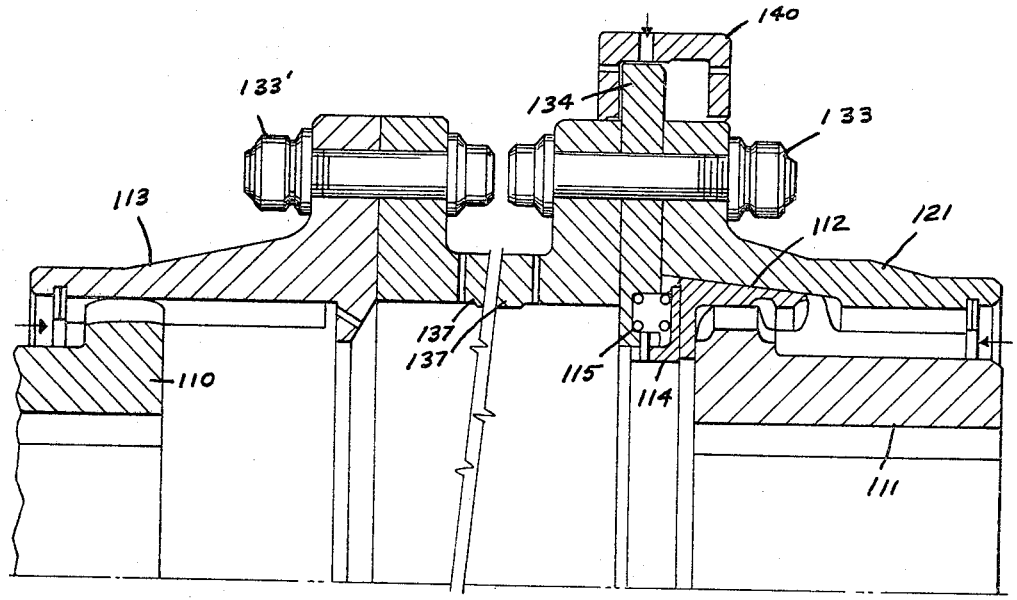
FIG. 4 is a cross sectional view of another embodiment of the invention.

In the embodiment of the invention shown in FIG. 4, a drive hub 110 is shown connected to a drive sleeve half 113, which is connected by bolt 133' and flanges 137 and bolts 133 to the sleeve half 121. A spring 115 similar to the spring 15 in FIG. 1 exerts a force on the cone ring 112 through pressure plate 114. The axial shifting force can be accomplished by a shifting collar 140, which applies a force to the spacer plate 134. This shifting fork could be in the form of a hydraulic cylinder acting on shifting collar 140 remotely controlled by hydraulic fluid to shift the sleeve in one direction or the other.

FIG. 4 illustrates a coupling that is spacer coupled with adequate room to remove the synchronizing cone ring 112 without moving the connected equipment. This spacer 137 allows removal of all coupling components without removing the connected equipment. These hubs have keyways, as shown, that may be used to support them on suitable shafts for connecting them to rotating machinery. The coupling while disengaged can be supported radially by the integral shifting collar and bearings, or by an internal bearing.

Figure 5:
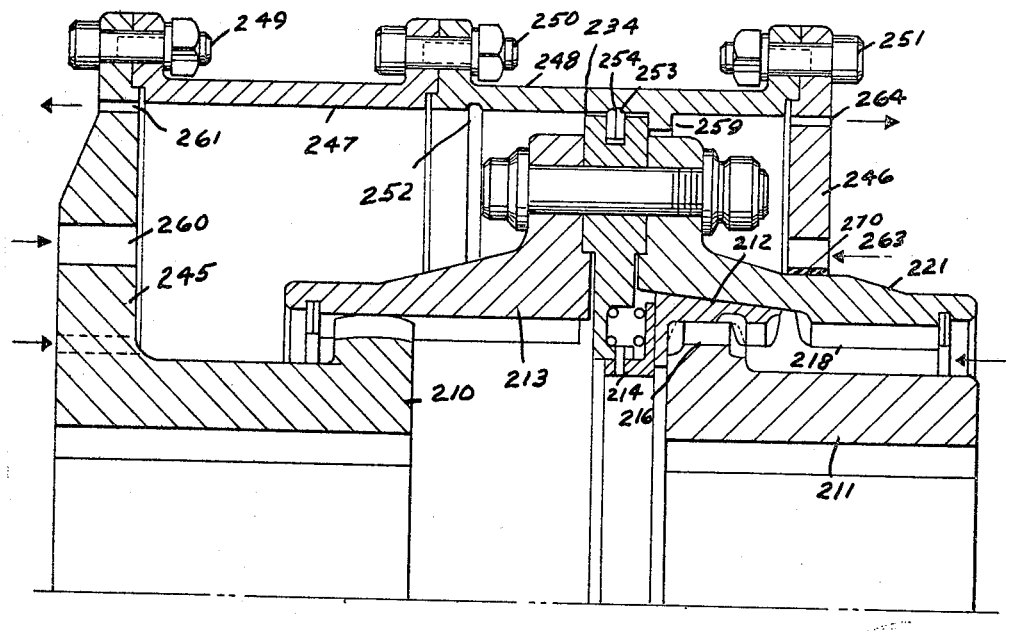
FIG. 5 is a view of yet another embodiment of the invention.

If shifting of the coupling is required only while the coupling is rotated at a speed, then the centrifugally shifted assembly illustrated in FIG. 5 may be used. The shifting force is developed by injecting oil into the appropriate cylinder where the oil rotation develops pressure which is applied against the face of piston 234. In this coupling, the hubs 211 and 210 are connected through sleeve halves 213 and 221. The general construction and the shifting arrangement in this embodiment of FIG. 5 is similar to that shown in FIG. 4, however, a cylinder is defined by the outwardly extending flanges 245 and the cylinder head 246, which are bolted to the cylinder body made up of halves 247 and 248 connected together by bolts 249, 250 and 251. The cylinder half 248 has internal grooves 252 and 253, which receive the ring 254 when the sleeve halves 213 and are in one of the respective positions, either with piston 234 against stop 259 or in the other extreme position with the coupling engaged. Ring 270 slidably engages hub 221. Oil may be inserted through the opening 260 and may be exhausted through the opening 261. Likewise, oil may be inserted through opening 263 and exhausted through opening 264 to move the piston 234, and therefore to cause the gear teeth 216 on the hub 211 to engage sleeve teeth 218 through the synchronizing action of the cone 212.

The embodiments of the invention in which an exclusive property or privilege is claimed are defined as follows:

1. In combination a clutch and a coupling comprising a hub having teeth and a sleeve having teeth, said hub and said sleeve being axially slidable relative to each other to bring said hub teeth and said sleeve teeth into engagement with each other when there is no relative rotational velocity between said hub and said sleeve, a ring, said ring having a friction surface means adapted to frictionally engage frictional means on said sleeve and on said hub, teeth on said ring, said ring teeth being disposed between said hub teeth and said sleeve teeth when said hub and said sleeve are in disengaged relation with each other, means on said coupling for forcing said frictional surfaces into engagement with each other when said sleeve teeth and said hub teeth are slidably moved toward each other whereby rotational force may be transmitted between said hub and said sleeve, and means on said hub teeth cooperating with said ring teeth to block said hub teeth and said sleeve teeth from moving into meshing relation with each other a relative rotational velocity exists between said hub and said sleeve, said first mentioned hub and a second externally toothed hub is provided, said hubs are spaced from each other and having their axes generally aligned with each other, said ring comprises a cone ring and said friction means comprises an external conical surface adapted to engage an internal conical surface on said sleeve.

2. The combination recited in claim 1 wherein said first hub teeth and the teeth of said second externally toothed hub have flanks that are shaped to conform to a part of an ellipsoid.

3. The combination recited in claim 1 wherein said first hub teeth and said second hub teeth each have tips that are shaped to conform to a part of an ellipsoid.

4. The combination recited in claim 1 wherein said sleeve has a flange member extending outward therefrom adapted to function as or attach to a piston, said coupling has said first mentioned hub and a second hub, a cylinder member fixed to said second hub and surrounding said flange, said flange having sealing means slidably engaging the inside surface of said cylinder, a cylinder head on said cylinder, means on said cylinder head slidably engaging said sleeve, means to insert fluid into said cylinder on a first side of said piston to force said second sleeve teeth toward said second hub teeth when the sleeve is rotated at a speed sufficient to develop centrifugal force within said fluid, and means for inserting fluid into said cylinder on a second side of said piston whereby said second sleeve teeth are forced in a direction from said second hub teeth, when oil pressure is developed in cylinder.

5. The combination recited in claim 1 wherein said means on said hub teeth and said ring teeth and said sleeve teeth comprise V-shaped ends on said teeth, a portion of the said V-shaped ends on said hub teeth and on said ring teeth being held in engagement with each other and blocking axial movement of said sleeves whenever said ring and said hub are rotating at different speeds.

6. The combination recited in claim 1 wherein said friction means on said sleeve comprises an internal conical surface, said friction means on said ring comprises an external conical surface, spring means, a pressure plate having an annular surface engaging said ring on a side thereof opposite said external conical surface, and spring means on said sleeve engaging said pressure plate urging said pressure plate toward said ring.

7. The combination recited in claim 6 wherein
said ring has an inwardly directed flange on the end thereof remote from the small apex of said conical surface,
said teeth on said ring are spaced from said flange and said hub teeth are disposed between said ring and said flange when the flanks of said hub teeth and the flanks of said ring teeth are out of engagement and said coupling is uncoupled.

8. The combination recited in claim 4 wherein
said cylinder has a first groove inside said cylinder and a second groove inside said cylinder spaced from said first groove,
said piston has a piston ring,
said piston ring being disposed in said first groove when said first hub teeth are out of engagement with said sleeve teeth,
said piston ring being disposed in said second groove when said first hub teeth are in engagement with said sleeve teeth,
whereby said sleeve is locked in relative axial position when it is in uncoupled position and when it is in coupled position.

References Cited

UNITED STATES PATENTS

| | | | |
|---|---|---|---|
| 1,953,628 | 4/1934 | Padgett | 192—53.6 |
| 2,640,573 | 6/1953 | Shenk | 192—53.6 |
| 2,896,760 | 7/1959 | Hebbinghaus | 192—53.6 |
| 3,154,181 | 10/1964 | Sigg | 192—86 X |
| 3,300,004 | 1/1967 | Peterson | 192—3.6 X |

BENJAMIN W. WYCHE III, Primary Examiner

U.S. Cl. X.R.

64—9; 192—48.5, 86, 105, 110